Dec. 22, 1925. 1,566,958
B. F. GILL ET AL
COUPLING FOR BOILER CONNECTIONS
Filed Sept. 6, 1921
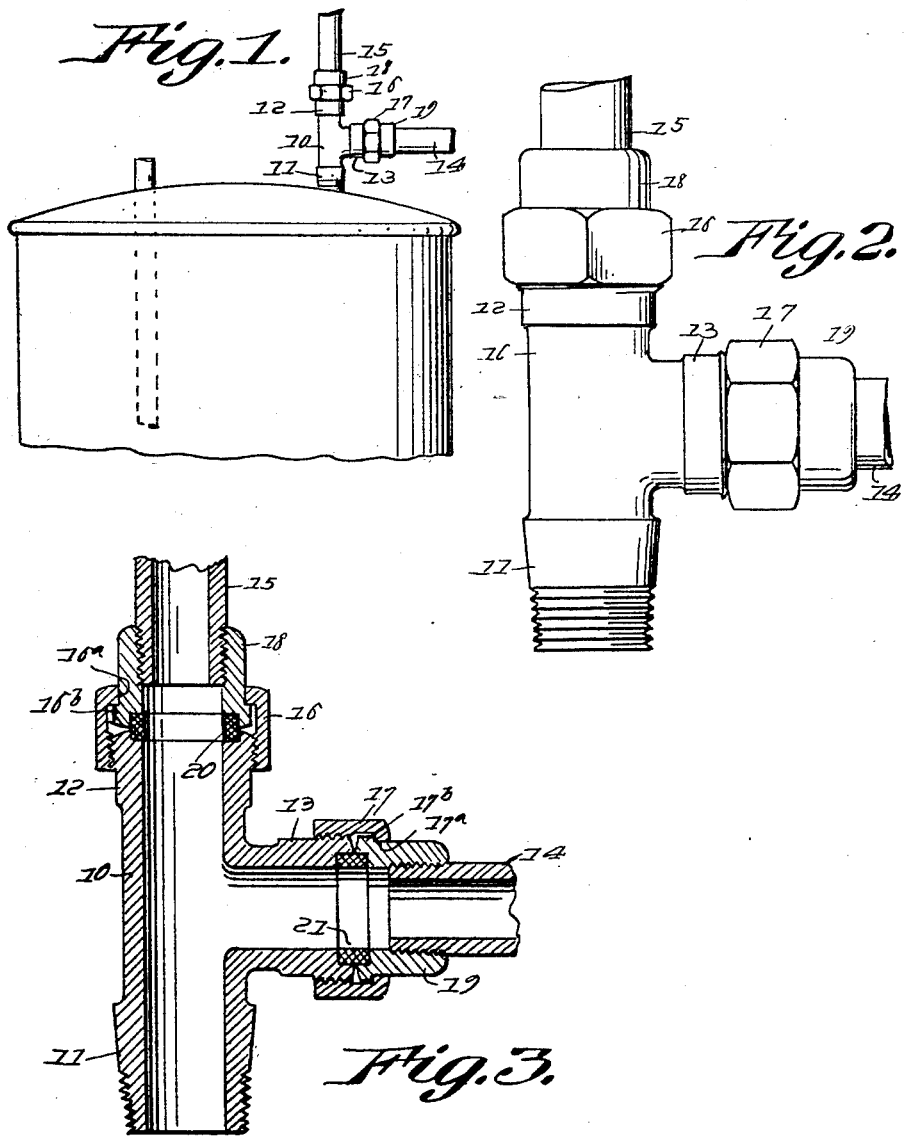

Patented Dec. 22, 1925.

1,566,958

UNITED STATES PATENT OFFICE.

BENJAMIN F. GILL AND CHARLES A. REED, OF TULSA, OKLAHOMA; SAID GILL ASSIGNOR OF HIS RIGHT TO T. E. RODERICK, OF TULSA, OKLAHOMA.

COUPLING FOR BOILER CONNECTIONS.

Application filed September 6, 1921. Serial No. 498,622.

*To all whom it may concern:*

Be it known that BENJAMIN F. GILL and CHARLES A. REED, citizens of the United States of America, residing at Tulsa, in the county of Tulsa and State of Oklahoma, have invented new and useful Improvements in Couplings for Boiler Connections, of which the following is a specification.

The object of the invention is to provide simplified and efficient means for forming a connection between the heater and house service system and a hot water or domestic boiler which connection under the ordinary practice involves a multiplicity of thimbles and coupling elements which are expensive to construct and assemble and are subject to leakage due to the opening of the joints, and which in particular involve special work in the maintaining, tapping and threading of the parts; and therefore the particular object of the present invention is to minimize the number of parts essential to the connection or coupling and to provide such a relation between the parts as to permit of the use of standard threads at the joints; and with this object in view the invention consists in a construction and combination of parts of which a preferred embodiment is shown in the accompanying drawings, wherein:—

Figure 1 is a view of a connection embodying the invention applied in the operative position to a domestic boiler.

Figure 2 is an enlarged detail side view of the connection.

Figure 3 is a detail sectional view of the same.

The connection embodies essentially a T-coupling 10 having the aligned arms 11 and 12 of which the former is adapted for engagement with the usual opening in the end or head of the boiler above the water line, and a side arm 13 for connection with the pipe 14 leading from the heater, the arm 12 being designed for connection with the hot water service pipe 15.

The arms 12 and 13 are provided with exterior standard threads for engagement by sleeves 16 and 17 having interior standard threads and lips 16ª and 17ª for engagement with shoulders 16ᵇ and 17ᵇ on thimbles 18 and 19 which are in turn provided with interior standard threads for engagement with the pipes 15 and 14 respectively.

The meeting or opposed ends of the thimbles and coupling arms 12 and 13 are convexed as shown, and fitted in seats provided in the faces of said opposed ends are gaskets 20 and 21, independent gaskets being arranged respectively in the end of each thimble and the opposed end of the coupling arm, so that when the sleeves are tightened upon the exteriorly threaded extremities of the arms of the coupling the gaskets are compressed to effect a tight joint.

It will be observed that the connection consists essentially of a fitting which is designed for engagement with an opening in a boiler and has arms which are connected by couplings to circulating pipes of which one leads from the heater (not shown) and the other to the house service system (not shown). Each coupling consists of a thimble threaded to one end of a pipe with a flanged end adjacent the end of the fitting, the adjacent end portions of the fitting and the thimble having internal concentric annular seats enclosing a resilient gasket under compression engaging both of said annular seats and overlapping the junction of the fitting and the thimble. The purpose of this coupling is to include a construction consisting of beveling off the adjacent edges of the fitting and the thimble divergently from their internal walls, whereby the connected pipe may fulcrum yieldably at a point on its internal wall when the pipe is connected slightly out of alignment with the fitting, still maintaining a compression seal and thereby preventing leakage at the junction of the adjacent edges at a point diametrically opposite the fulcrum.

It will be observed that the walls of the legs for the house service and heater connection, as well as the thimbles connecting therewith, are thickened as regards the wall of the body of the coupling. Thus, the exterior threads can be applied without weakening the coupling at the point of forming the threads and, furthermore, the body of the coupling and the legs are of uniform bore throughout and unobstructed.

In addition to these features, it will be noted that the adjacent end or adjacent edges of the legs and the thimbles are beveled off, that is, divergently, for several reasons. For instance, in installing a boiler connection as disclosed herein, the points of connections of both pipes 14 and 15 may not be in exact alignment. In other words, the ends of these pipes remote from where they connect with the T coupling 10 may be out of axial alignment which would necessitate the changing of position of the T coupling 10 or changing the point of connection with the surface. To accommodate these conditions, the adjacent ends of the legs and the thimbles are beveled off divergently, allowing the pipes 14 and 15 to be placed at necessary angles to enable the connections to be made, the beveled edges allowing these parts to be disposed angularly.

Another essential point is that the packings or gaskets 20 and 21 are located so that substantially equal parts thereof will extend beyond the gap between the beveled edges of the legs and the thimbles, thereby permitting disposing the pipes 14 and 15 angularly. The gaskets flex to a certain extent, further permitting of this angular disposition of the pipes 14 and 15.

This particular construction further serves to permit the thimbles 16 and 17 to be backed off from screw-threaded engagement with the legs of the T coupling, the gaskets being directly over the joints or the space between the beveled edges of the legs and the thimbles, still acting to prevent excessive leakage, and if there is any leakage, it is easily perceptible when the sleeves are backed off. This can be done without entirely cutting off the service, that is, the fluid service. In other words, if there is a leakage, it is possible to back off the sleeves 16 and 17 to ascertain whether the leakage occurs between the beveled edges and if there is such a leakage at that point, then the leakage can be repaired; if not, the sleeves can be retightened and if the leakage is elsewhere, the same can be repaired.

Furthermore, if there is a leakage between the beveled edges of the legs and the thimbles, the same having been ascertained by backing off the sleeves, the fluid flow may then be cut off and it is possible to insert a sharp instrument, such as a knife or the like, to enable the gaskets to be severed so as to disconnect the thimbles or rather move them laterally, together with the pipes 14 and 15, or either one that may be improperly connected. The space between the beveled edges of the legs and the thimbles permit an instrument to be inserted to sever the gaskets.

The seats for the gaskets 20 and 21 are formed by counterboring both the thimbles and the connecting legs so that the perimeters of the gaskets lie flush with the interior walls of the legs and the thimbles. The seats or recesses for the gaskets are concentric and, as previously stated, the bevels of the legs and the thimbles are divergent, said adjacent ends, in overlying the gaskets as in Figure 3, acting to render the joint or coupling leak-proof, and, as previously stated, are in a position to be severed by inserting a cutting instrument between the beveled edges.

Having described the invention, what is claimed as new and useful is:—

A coupling including a fitting, a pipe connected thereto, said coupling comprising a thimble threaded to one end of the pipe with a flanged end adjacent the end of the fitting, the adjacent end portions of the fitting and the thimble having internal concentric annular seats, a resilient gasket under compression engaging both of said annular seats and overlapping the junction of the fitting and the thimble, the adjacent edges of the fitting and the thimble being beveled off divergently from their internal walls, whereby the connected pipe may fulcrum yieldably at a point on its internal wall, when the pipe is connected slightly out of alignement with the fitting, still maintaining a compression seal and preventing leakage at said junction diametrically opposite said fulcrum, and a union nut coupling the adjacent ends of the fitting and the thimble.

In testimony whereof they affix their signatures.

BENJAMIN F. GILL.
CHARLES A. REED.